(12) United States Patent
Winsor

(10) Patent No.: US 8,614,743 B2
(45) Date of Patent: Dec. 24, 2013

(54) SECURITY CAMERA SYSTEM AND METHOD OF STEERING BEAMS TO ALTER A FIELD OF VIEW

(75) Inventor: Robert Scott Winsor, Round Hill, VA (US)

(73) Assignee: Exelis Inc., McLean, VA (US)

( * ) Notice: Subject to any disclaimer, the term of this patent is extended or adjusted under 35 U.S.C. 154(b) by 1387 days.

(21) Appl. No.: 11/860,037

(22) Filed: Sep. 24, 2007

(65) Prior Publication Data

US 2009/0079824 A1    Mar. 26, 2009

(51) Int. Cl.
*H04N 7/18* (2006.01)
(52) U.S. Cl.
USPC ............ 348/143; 348/142; 348/144; 348/145
(58) Field of Classification Search
None
See application file for complete search history.

(56) References Cited

U.S. PATENT DOCUMENTS

| | | |
|---|---|---|
| 3,226,721 A | 12/1965 | Gould |
| 4,080,605 A | 3/1978 | Hilton |
| 4,480,254 A | 10/1984 | Spencer et al. |
| 5,315,436 A | 5/1994 | Lowenhar et al. |
| 5,541,613 A | 7/1996 | Lam et al. |
| 5,625,499 A | 4/1997 | Chen |
| 5,677,796 A | 10/1997 | Zimmerman et al. |
| 5,689,275 A | 11/1997 | Moore et al. |
| 5,724,164 A | 3/1998 | Lowenhar et al. |
| 5,739,796 A | 4/1998 | Jasper, Jr. et al. |
| 5,796,474 A | 8/1998 | Squire et al. |
| 6,259,865 B1 * | 7/2001 | Burke et al. .................. 396/327 |
| 6,344,937 B1 | 2/2002 | Sparrold et al. |
| 6,359,681 B1 | 3/2002 | Housand et al. |
| 6,523,360 B2 | 2/2003 | Watanabe et al. |

(Continued)

FOREIGN PATENT DOCUMENTS

| | | |
|---|---|---|
| DE | 3326233 A1 | 2/1985 |
| DE | 19955205 A1 | 5/2001 |

(Continued)

OTHER PUBLICATIONS

R. Windsor, M. Braustein, Conformal Beam Steering Apparatus for Simultaneous Manipulation of Optical and Radio Frequency Signals, Proceedings of the SPIE—The International Society for Optical Engineering Spie—Int. Soc. Opt. Eng. USA, vol. 6215, 62150G (2006).

(Continued)

*Primary Examiner* — Djenane Bayard
(74) *Attorney, Agent, or Firm* — Edell, Shapiro & Finnan, LLC

(57) ABSTRACT

A security camera system according to present invention embodiments includes a telephoto type lens with one or more factors of optical zoom. A set of prisms that steer incoming beams from the surrounding environment (to adjust the field of view) is disposed in front of the lens. The security camera system preferably includes a wide angle staring mode that encompasses a large field of view, where the prisms are oriented to provide no steering effect. The security camera system further includes a high-resolution zoom mode, where the telephoto lens focuses on a region of interest and the prisms perform beam steering to adjust the field of view and enable the region of interest or an object to remain at the center of the security camera system view. Image processing techniques may be employed that consider the beam steering angle and the field of view to compensate for distortion effects.

20 Claims, 8 Drawing Sheets

(56) References Cited

U.S. PATENT DOCUMENTS

| | | | |
|---|---|---|---|
| 6,538,621 B1 | 3/2003 | Sievenpiper et al. | |
| 6,549,700 B1 | 4/2003 | Sweatt et al. | |
| 6,812,903 B1 | 11/2004 | Sievenpiper et al. | |
| 6,859,304 B2 | 2/2005 | Miller et al. | |
| 6,986,096 B2 | 1/2006 | Kittaka et al. | |
| 7,050,241 B2* | 5/2006 | Kojima et al. | 359/689 |
| 7,079,730 B2 | 7/2006 | Fallahi et al. | |
| 7,136,236 B2* | 11/2006 | Ohashi | 359/749 |
| 7,187,491 B1 | 3/2007 | Bratkovski | |
| 7,224,382 B2* | 5/2007 | Baker | 348/46 |
| 7,227,706 B2* | 6/2007 | Yagyu et al. | 359/737 |
| 7,239,463 B2 | 7/2007 | Braun et al. | |
| 7,333,143 B2* | 2/2008 | Saito et al. | 348/335 |
| 7,339,539 B2 | 3/2008 | Joannopoulos et al. | |
| 7,358,498 B2* | 4/2008 | Geng et al. | 250/347 |
| 7,463,214 B2 | 12/2008 | Winsor et al. | |
| 7,609,289 B2* | 10/2009 | Rastegar et al. | 348/36 |
| 7,642,978 B2 | 1/2010 | Braunstein et al. | |
| 8,068,154 B2* | 11/2011 | Jacob et al. | 348/294 |
| 2002/0084869 A1 | 7/2002 | White | |
| 2004/0109059 A1* | 6/2004 | Kawakita | 348/143 |
| 2005/0195505 A1 | 9/2005 | Braun et al. | |
| 2005/0213964 A1 | 9/2005 | Kreger et al. | |
| 2006/0125713 A1 | 6/2006 | Thevenot et al. | |
| 2006/0202909 A1 | 9/2006 | Nagai | |
| 2006/0249804 A1 | 11/2006 | Mouli | |
| 2008/0291101 A1 | 11/2008 | Braunstein et al. | |
| 2009/0015891 A1* | 1/2009 | Kane | 359/198 |
| 2009/0080048 A1* | 3/2009 | Tsao | 359/211 |
| 2010/0066809 A1* | 3/2010 | Cormack et al. | 348/36 |

FOREIGN PATENT DOCUMENTS

| | | |
|---|---|---|
| EP | 814344 A2 | 12/1997 |
| JP | 2001066138 | 3/2001 |
| JP | 2007166035 | 6/2007 |

OTHER PUBLICATIONS

P. Vodo, P.V. Parimi W.T. Lu and S. Sridhar, Microwave Photonic Crystal with Tailor-made Negative Refractive Index, Applied Physics Letter vol. 85, No. 10 (Jan. 1, 2004), pp. 1858-1860.

F. Daschner, et al. Photonic Crystals as Host Material for a New Generation of Microwave Components, Advances in Radio Science, vol. 4 (2006), pp. 17-19.

Caloz, Christophe, Itoh, Tatsuo, "Electromagnetic Metamaterials: Transmission Line Theory and Microwave Applications," 2006 John Wiley and Sons.

H.D. Griffiths and M.R. Khan, "Antenna Beam Steering Technique Using Dielectric Wedges," IEE Proceedings, vol. 136, Pt. H, No. 2, Apr. 1989.

Japan Office Action, May 28, 2013, 7 pages.

* cited by examiner

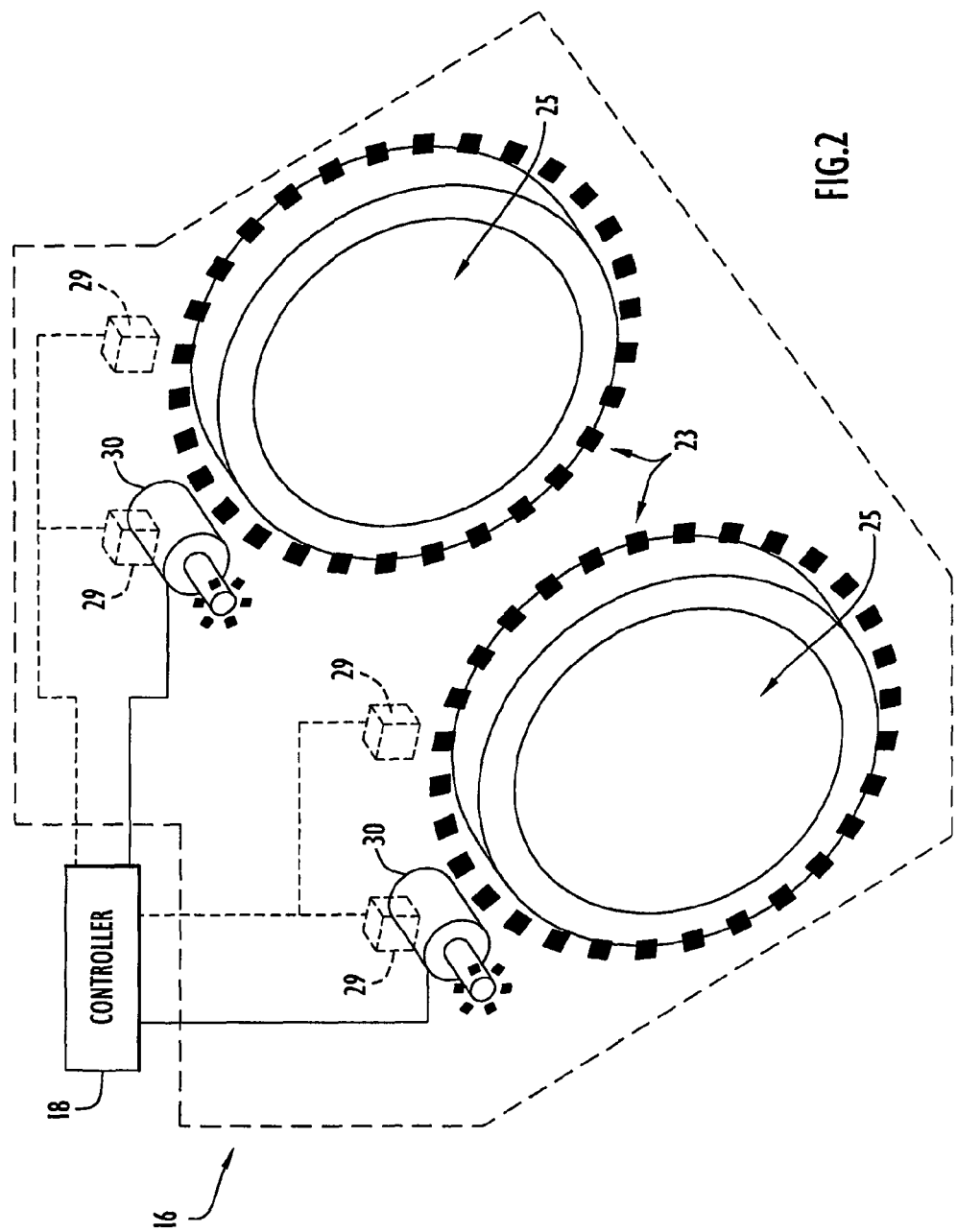

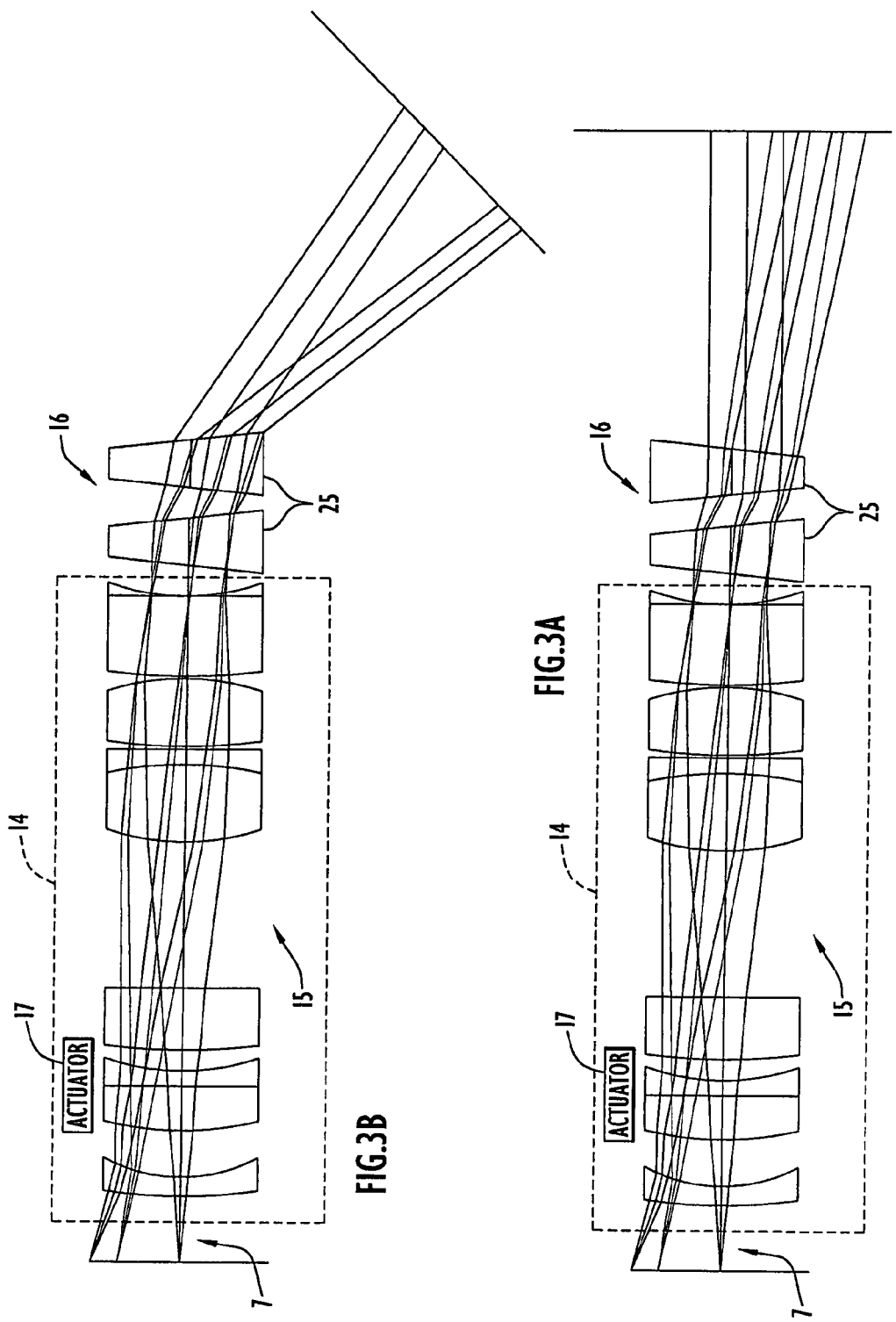

SECURITY CAMERA SYSTEM AND METHOD OF STEERING BEAMS TO ALTER A FIELD OF VIEW

BACKGROUND OF THE INVENTION

1. Technical Field

The present invention pertains to security cameras. In particular, the present invention pertains to a security camera system including a plurality of rotatable prisms that steer incoming beams to control and adjust the field of view.

2. Discussion of Related Art

Security cameras are utilized in various applications to monitor activity in an area. The cameras are generally hidden from view in order to prevent their presence from being known and to provide discreet monitoring of the area. Typically, the security cameras are disposed within hemispherical dome mountings. These types of mountings are generally opaque to an observer (e.g., black, etc., but transparent to near infrared) and prevent the observer from determining the field of view of the camera (e.g., the location the security camera is aimed or pointed). However, the observer may view the security camera through the dome mounting with a pair of night vision type goggles and an illuminating device illuminating the dome mounting. This enables the observer to determine the aim of the camera (and field of view) and avoid being monitored in the area.

SUMMARY OF THE INVENTION

According to present invention embodiments, a security camera system includes a telephoto type lens with one or more factors of optical zoom. A set of prisms that steer incoming beams from the surrounding environment (to adjust the field of view) is disposed in front of the lens. The security camera system preferably includes a wide-angle staring mode that encompasses a large field of view. In this case, the prisms are oriented to provide little or no steering effect. The security camera system further includes a high-resolution zoom mode, where the telephoto or zoom lens focuses on a region of interest and the prisms perform beam steering to adjust the field of view and enable the region of interest to remain at the center of the security camera system view.

Prism-based beam steering for imaging applications introduces various effects to the resulting image. For example, dispersion effects of the prisms reduce the contrast and resolution of the resulting image. Accordingly, the prisms may include gratings applied to one of the surfaces, thereby creating a "grism". The grism is specifically designed for the application to control dispersion over the spectral range of interest. A further effect of prism beam steering includes field distortion. In particular, a beam becomes compressed along the axis of steering as the prisms steer the beam. This creates a "squashed" appearance to the image. For example, a camera with an initially wide field of view (e.g., 60°) experiences up to approximately 15% distortion at the edges, but no distortion at the center. However, a camera with a 1° field of view experiences essentially no distortion as a function of field angle. In this case, the distortion is produced entirely from the steering of the prisms. By way of example, a 1° field of view with a steering angle of 45° includes a nearly uniform image distortion of approximately 30% appearing as a squashing of the image along the axis of steering. These effects are addressed by the present invention embodiments through the use of image processing techniques (e.g., a processor with image manipulation software). The processor (with image manipulation software) may be embedded within the security camera architecture and adjustments to images are made prior to the security camera system providing the resulting images. The processor takes into account the beam steering angle and the field of view of the security camera system.

The processor (and embedded software) accomplishes several tasks including the correction of image distortion as described above. The processor may further serve as a motion controller in the present invention embodiments to coordinate prism movement or rotation with the telephoto or zoom capability. In particular, a particular region of interest for zooming may not be on-axis while the security camera system is focused with a wide field of view. In this case, a user commands the security camera system to focus on the region of interest, and the lens assembly zooms in on the area while the prisms pan the field of view to maintain the target or desired object on-center.

The present invention embodiments provide several advantages. In particular, the present invention embodiments essentially employ no moving external parts (e.g., all moving parts are internal to the security camera system). Conventional systems typically move the entire camera and lens in order to sweep across a particular volume. However, the security camera system of the present invention embodiments provides wide angle and telephoto or zoom viewing without the need to physically move the entire assembly (e.g., only the prisms need to move or be rotated to perform beam steering to adjust the field of view). This enables the system to include a very small aperture that impedes viewing of the camera aim. In one embodiment, the security camera system appears as a small inconspicuous disk mounted to a wall or other structure. The security camera system includes a small form factor and a fast reaction to changing conditions (e.g., a bank robbery, where the bank desires a good image of an assailant face). Thus, a person standing near the security camera system may not realize the presence of the security camera system behind the disk, and cannot determine the camera view or operation regardless of the orientation. This provides a number of advantages for a variety of security situations. Further, this feature is advantageous for observers of wildlife, where researchers may use the security camera system to track when a certain movement has occurred (e.g., with a much lower probability of disrupting the environment).

Moreover, the telephoto or zoom lens may be implemented as an integral unit with the prisms, where the telephoto assembly (e.g., lens and prisms) may have the appearance of and be utilized as a telephoto lens. This enables a user of the telephoto assembly (e.g., photographer, operator of the security camera system, etc.) to aim the telephoto assembly in a particular direction, while actually viewing areas substantially off-axis due to the prisms. Since observers are likely to believe the security camera system is pointed along the direction of the telephoto lens, monitoring of suspicious activity may be performed by the security camera system without the obvious issue of a camera pointing at the subject. Accordingly, suspects are more likely to place themselves within view of the security camera system, thereby enabling easier and discreet ascertainment of information.

Accordingly, the present invention embodiments provide a security camera system that is compact, able to view a large area and/or zoom in on a narrow area for detailed imaging, and challenging for observers to locate in an area and determine the camera view.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 2 is a schematic block diagram of the prism assembly of the security camera system of FIG. 1 according to an embodiment of the present invention.

FIGS. 3A-3B are diagrammatic illustrations of exemplary beams traversing the lens and prism assemblies of the security camera system of FIG. 1 according to an embodiment of the present invention.

DETAILED DESCRIPTION OF THE PREFERRED EMBODIMENTS

Figure 1:
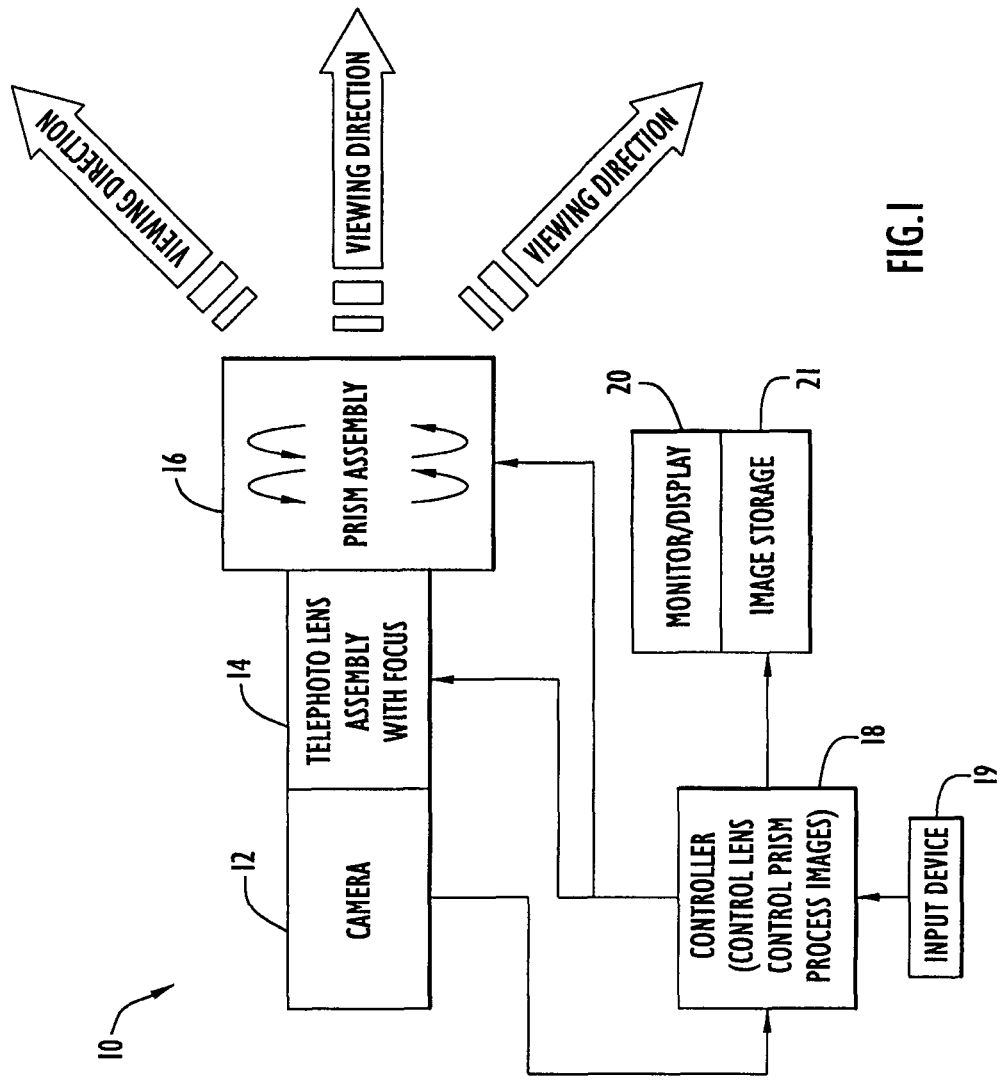
FIG. 1 is a schematic block diagram of a security camera system according to an embodiment of the present invention.
Figure 4A:
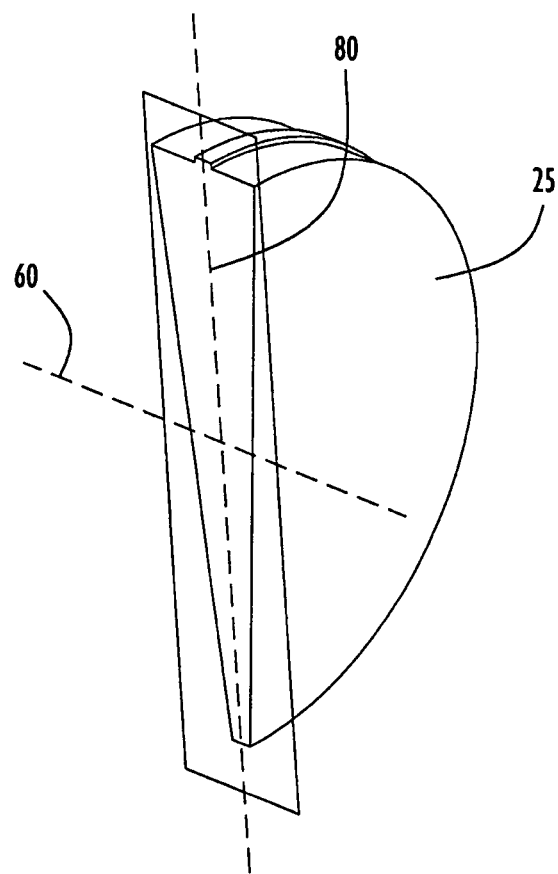
FIG. 4A is a perspective view in partial section of an exemplary wedge prism for use by the security camera system of FIG. 1 according to an embodiment of the present invention.
Figure 4B:
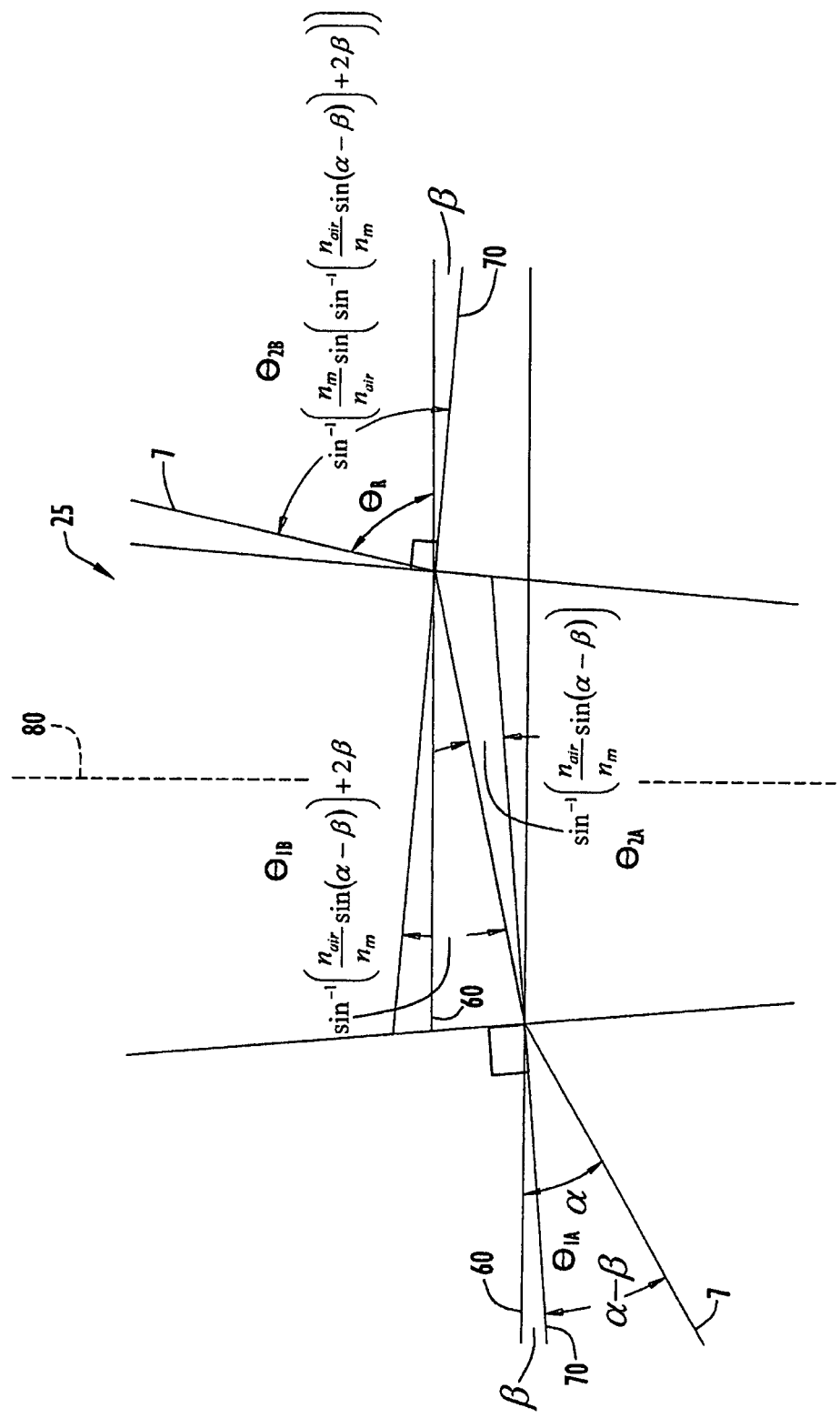
FIG. 4B is a diagrammatic illustration of a beam being steered by the exemplary wedge prism of FIG. 4A.

The present invention embodiments pertain to a security camera system that includes a plurality of prisms. The prisms are rotated relative to each other to steer incoming light beams from the surrounding environment and control the field of view. Thus, the beam steering enables the security camera system to scan an area or adjust the field of view without moving the entire security camera system. A security camera system according to an embodiment of the present invention is illustrated in FIG. 1. Specifically, security camera system 10 includes a camera or image device 12, a lens assembly 14, a prism assembly 16, a controller 18, a display device 20 and an image storage unit 21. The components may be placed in any suitable housing for mounting and/or placement within an area with limited visibility to an observer. Camera 12 may be implemented by any conventional or other imaging device and preferably includes a CCD or other light detecting array to capture images. Lens assembly 14 is coupled to camera 12 and includes a telephoto or zoom lens 15 (FIGS. 3A-3B), preferably providing one or more zoom levels and various wide angle views. The lens assembly further includes one or more actuators 17 (FIGS. 3A-3B) to adjust the lens to provide the desired view (e.g., zoom or wide angle view) and corresponding focus. The actuators may be implemented by any conventional or other actuators (e.g., motors, mechanical mechanisms, etc.) to adjust (e.g., rotate, elongate and/or contract, etc.) the lens, while the lens may be implemented by any conventional or other lens providing the desired zoom and/or wide angle characteristics.

Prism assembly 16 steers incoming light beams from the surrounding environment into lens assembly 14 by rotating one or more prisms relative to each other as described below to control the field of view of the security camera system. Controller 18 is coupled to camera 12, lens assembly 14 and prism assembly 16. The controller may be implemented by any conventional or other processing device (e.g., microprocessor, controller, control circuitry, logic, etc.) and controls the lens and prism assemblies to adjust the field of view of the security camera system as described below. Controller 18 further receives images from camera 12 (captured through the lens and prism assemblies) and applies image processing techniques to those images (e.g., to remove distortions, etc.) as described below to produce resultant images for display on display device 20 and/or storage within image storage unit 21. The display device may be implemented by any conventional or other display or monitor (e.g., LCD, etc.), while the image storage unit may be implemented by any conventional or other memory or storage unit (e.g., memory, database, etc.) to store the processed images.

Prism assembly 16 steers incoming light beams to control the field of view of the security camera system as illustrated in FIG. 2. Specifically, prism assembly 16 includes a plurality of prisms 25, a plurality of rotating assemblies 23, and a plurality of motors 30. Each prism 25 is typically includes the optical characteristics of a conventional Risley type wedge-shaped prism. By way of example only, the prism assembly is described with respect to two sequential (e.g., first and second) prisms 25. However, the prism assembly may include two or more prisms to perform beam steering with the desired deflection or steering angle.

Prisms 25 are each mounted on a corresponding rotating assembly 23. The rotating assemblies may be implemented by any conventional or other assemblies, and typically include a rotating mechanism (e.g., rotating ring, platform or other suitable structure) to secure and rotate a prism. The rotating assemblies are each manipulated by a corresponding motor 30 to rotate the prisms relative to each other to produce the desired deflection or steering angle for the beam. The motors may be implemented by any conventional or other motors or actuators to rotate the prisms. By way of example, the prism assembly includes two rotating assemblies disposed in a manner to position prisms 25 coincident each other. This enables a beam to sequentially traverse the prisms for desired steering as described below.

Motors 30 are controlled by controller 18 to rotate the prisms in a certain manner relative to each other to achieve a desired beam steering. The controller is basically utilized within a feedback loop to control prism rotation. For example, the rotating assemblies and/or motors may include sensors 29 to measure the prism rotation. The sensors may be implemented by any conventional or other sensors (e.g., encoders, potentiometers, etc.) and disposed at any suitable locations to measure the prism rotation. These measurements are provided to the controller to enable control of prism rotation to a desired orientation as described below and steering of the incoming beam. The controller further utilizes the sensor measurements for subsequent adjustment of the prism orientations (e.g., to alter the field of view) and to apply image processing techniques to the received images as described below (e.g., compensate for adverse effects, such as beam squinting, field distortion, etc.).

Alternatively, telephoto or zoom lens 15 may be implemented as an integral unit with prisms 25, where the combined lens and prism assembly may have the appearance of the telephoto lens. This enables the security camera system to be aimed in a particular direction, while actually viewing areas substantially off-axis due to the prisms. Since observers are likely to believe the security camera system is pointed along the direction of the telephoto lens, monitoring of suspicious activity may be performed without the obvious issue of a camera pointing at the subject. Accordingly, suspects are more likely to place themselves within view of the security camera system, thereby enabling easier and discreet ascertainment of information. In addition, the combined lens and prisms may be formed as a lens unit for photographers in order to inconspicuously capture images of subjects (e.g., wildlife, children, etc.).

Security camera system 10 preferably includes a wide-angle staring mode that encompasses a large field of view. In this case, prisms 25 are oriented to provide little or no steering effect. The security camera system further includes a high-resolution zoom mode, where telephoto or zoom lens 15 focuses on a region of interest (or object within that region) and the prisms steer the incoming beam to enable the region of interest (or object) to remain at the center of the security camera system view. The steering capability of the prisms is approximately (and preferably slightly larger than) the instantaneous field of view (IFOV) of the camera and telephoto lens combination when the security camera system is in the wide angle viewing mode (e.g., up to +/−60°). For example, in a wide angle mode encompassing an area of 72° by 96°, the diagonal corners of the IFOV are approximately 120° apart.

Referring to FIGS. 3A-3B, a beam 7 is received by prism assembly 16 from the surrounding environment. The beam traverses a first prism 25 and is refracted by the prism characteristics. The refracted beam subsequently traverses a second prism 25 and is again refracted by the characteristics of that second prism. The orientation of prisms 25 relative to each other enables the prisms to collectively produce a resulting beam for transference to lens 15 of lens assembly 14. In effect, the orientation of prisms 25 enable beams from a certain field of view to be passed to the lens assembly. For example, prisms 25 are oriented to provide substantially no beam steering in FIG. 3A. This typically occurs when the security camera system is in the wide angle staring mode. In this case, security camera system 10 is focused on the field of view to which the security camera system is pointing. Thus, beams from the front of security camera system 10 are received and passed to lens assembly 14.

However, when prisms 25 are oriented to provide beam steering as illustrated in FIG. 3B, beams from the direction of the beam steering are received and transferred to the lens assembly. This typically occurs in the telephoto or zoom mode, where actuators 17 manipulate lens 15 to provide the desired zoom level and corresponding focus. In this case, security camera system 10 is focused downward (e.g., as viewed in FIG. 3B) and beams from that downward direction are received and transferred to the lens assembly. The prism rotation basically enables the security camera system to alter the field of view and scan any desired regions.

Controller 18 controls actuators 17 to manipulate lens 15, and further controls motors 30 to rotate the prisms in a manner to achieve the desired steering effect based on the analysis described below (e.g., Equations 1-11 to achieve the desired steering angle, $\theta_S$ or $\phi$). The controller may manipulate both prisms simultaneously to achieve the desired orientation, or one prism may be stationary while the other prism is manipulated. The controller may be coupled to various input devices 19 (e.g., buttons, slides, switches, etc.) to enable a user to enter the desired viewing operations (e.g., zoom level or mode, wide angle mode, scanning or viewing direction, etc.).

An exemplary optical wedge prism 25 that may be employed by the present invention embodiments to steer or refract a beam is illustrated in FIGS. 4A-4B and 5-6. Initially, prism 25 is substantially circular and includes a generally triangular (or wedge shaped) transverse cross-section (FIG. 4A) providing a wedge angle (e.g., varying prism thicknesses along a vertical optical axis 80, where the wedge angle is defined by the wedge or prism narrow portion). The prism preferably includes the optical characteristics of a conventional Risley type prism. The prism further includes planar surfaces (e.g., no aspherical surfaces), thereby providing a planar aperture in front of the security camera system. However, the prisms may alternatively be implemented by any suitable optical device with any desired configuration or optical characteristics (e.g., lenses, prisms, spherical surfaces, etc.).

Figure 5:
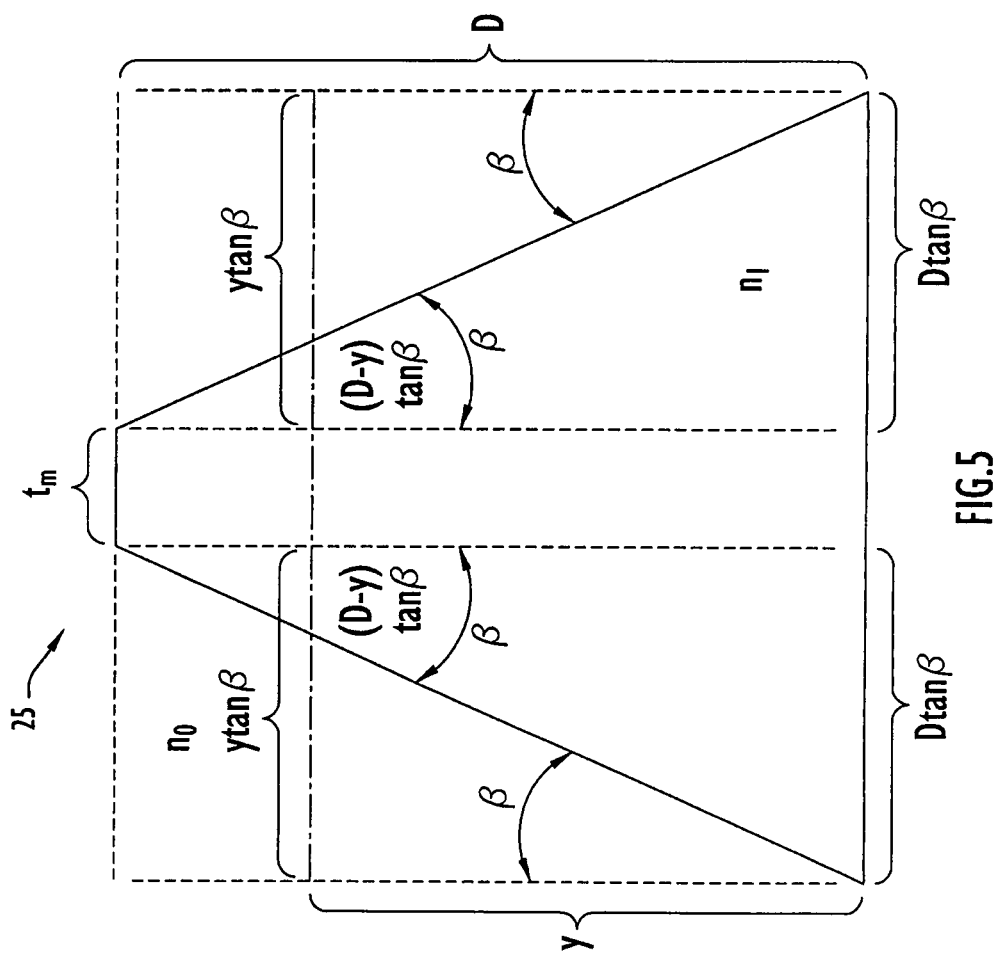
FIG. 5 is a view in elevation and section of the exemplary wedge prism illustrated in an inverted position with respect to FIG. 4A.
Figure 6:
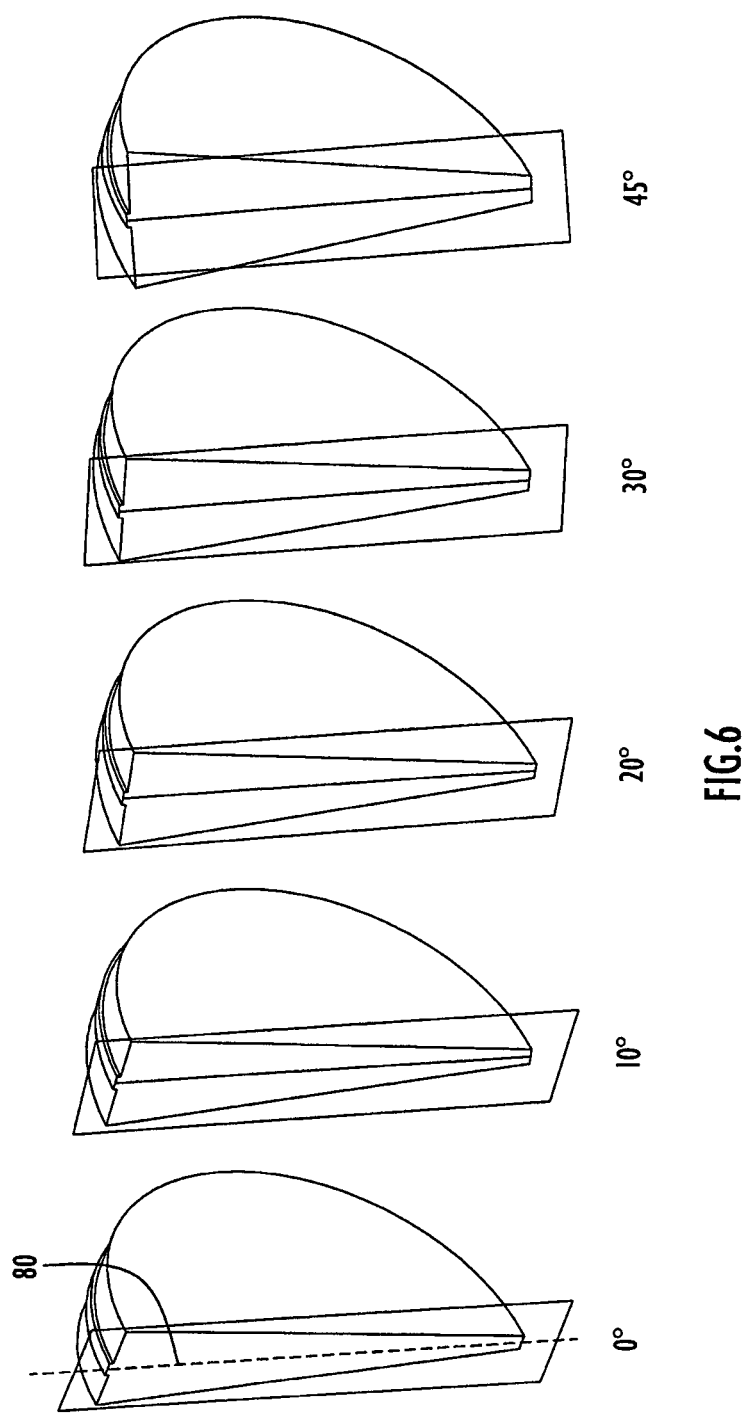
FIG. 6 are views in partial section of the exemplary wedge prism of FIG. 4A illustrating a varying wedge angle.

The various prism thicknesses enable the wedge angle to vary at successive angular prism locations relative to the prism optical axis (e.g., the wedge angle varies at prism rotations of 0°, 10°, 20°, 30° and 45° relative to the optical axis as viewed in FIG. 6). A cross-section of prism 25 includes a base and a truncated vertex (FIG. 5) disposed opposite the base with exterior prism faces oriented at the wedge angle and not perpendicular to an axis of rotation 60 (FIG. 4A) of the prism (e.g., the axis about which the prism is rotated, typically the axis extending through the centerpoints of the prism faces).

Specifically, a beam 7 (FIG. 4B) is directed to traverse prism 25. The propagation of the beam exiting the prism may be determined from Snell's Law as follows, $$n_1 \sin\theta_1 = n_2 \sin\theta_2 \quad \text{(Equation 1)}$$

where $n_1$ is the index of refraction of the first material traversed by the beam, $n_2$ is the index of refraction of the second material traversed by the beam, $\theta_1$ is the angle of the beam entering into the second material, and $\theta_2$ is the angle of the refracted beam within that material. The steering angles of interest for beam 7 directed toward prism 25 are determined relative to rotation axis 60 (e.g., an axis perpendicular to and extending through the centerpoints of the prism front and rear faces) and in accordance with Snell's Law. Thus, each of the equations based on Snell's Law (e.g., as viewed in FIG. 4B) has the equation angles adjusted by the wedge angle (e.g., $\beta$ as viewed in FIG. 4B) to attain the beam steering value relative to the rotation axis as described below.

Beam 7 enters prism 25 at an angle, $\theta_{1A}$, that is within a plane containing optical axis 80 for the prism (e.g., the vertical line or axis through the center of the prism point from the thinnest part to the thickest part) and rotation axis 60. This angle is the angle of the beam entry, $\alpha$, relative to rotation axis 60 and adjusted by the wedge angle, $\beta$ (e.g., $\theta_{1A}=\alpha-\beta$). The beam is refracted at an angle, $\theta_{2A}$, relative to surface normal 70 of the prism front surface and determined based on Snell's Law as follows, $$\theta_{2A} = \left(\sin^{-1}\left(\frac{n_{air}}{n_M}\sin(\theta_{1A})\right)\right) \quad \text{(Equation 2)}$$

where $n_{air}$ is the index of refraction of air, $n_M$ is the index of refraction of the prism material and $\theta_{1A}$ is the angle of beam entry.

The beam traverses the prism and is directed toward the prism rear surface at an angle, $\theta_{1B}$, relative to surface normal 70 of that rear surface. This angle is the angle of refraction by the prism front surface, $\theta_{2A}$, combined with wedge angles, $\beta$, from the front and rear prism surfaces and may be expressed as follows.

$$\theta_{1B}=\theta_{2A}+2\beta \quad \text{(Equation 3)}$$

The beam traverses the prism rear surface and is refracted at an angle, $\theta_{2B}$, relative to surface normal 70 of the prism rear surface and determined based on Snell's Law as follows, $$\theta_{2B} = \left(\sin^{-1}\left(\frac{n_M}{n_{air}}\sin(\theta_{1B})\right)\right) \quad \text{(Equation 4)}$$

where $n_M$ is the index of refraction of the prism material, $n_{air}$ is the index of refraction of air, and $\theta_{1B}$ is the angle of beam entry. The angle of refraction, $\theta_R$, relative to rotation axis 60 is simply the refracted angle relative to surface normal 70 of the prism rear surface, $\theta_{2B}$, less the wedge angle, $\beta$, of the prism rear surface (e.g., as viewed in FIG. 4B) and may be expressed as follows.

$$\theta_R = \theta_{2B} - \beta = \sin^{-1}\left(\frac{n_M}{n_{air}}\sin\left(\sin^{-1}\left(\frac{n_{air}}{n_M}\sin(\alpha - \beta)\right) + 2\beta\right)\right) - \beta \quad \text{(Equation 5)}$$

Additional terms are needed in order to extend the formula to a second sequential prism. In particular, Snell's law is applied to the additional prism via a projection technique that decomposes beam 7 refracted by the first prism into X and Y components with respect to an optical axis of the second prism. The X component of the beam is derived from the beam exiting the first prism. This beam component exits the first prism at a given angle, $\rho$, which may be determined by setting angle $\alpha$ to zero in Equation 5 as follows, $$\rho = \sin^{-1}\left(\frac{n_M}{n_{air}}\sin\left(\sin^{-1}\left(\frac{n_{air}}{n_M}\sin(-\beta)\right) + 2\beta\right)\right) - \beta \quad \text{(Equation 6)}$$

where $n_M$ is the index of refraction of the prism material, $n_{air}$ is the index of refraction of air, and $\beta$ is the wedge angle.

The optical axis of the second prism may be angularly offset from the optical axis of the first prism. In this case, the beam from the first prism needs to be decomposed into the X and Y components. The X component of the angle of incidence of the beam on the second prism creates an effect on the wedge angle. Basically, the angle of incidence makes the wedge angle of the second prism appear larger (FIG. 6), thereby causing greater steering effects on the beam in the second prism.

In order to account for the angle of incidence of the beam into the second prism, and the effective increase in the wedge angle, a new wedge angle, $\beta_\gamma$, is derived from the expansion of the wedge angle along the X-axis of the angle of incidence and may be expressed as follows, $$\beta_\gamma = \tan^{-1}\left(\frac{\tan\beta}{\cos(\rho\sin(\gamma))}\right) \quad \text{(Equation 7)}$$

where $\beta$ is the wedge angle, $\rho$ is the X component of the beam exiting the first prism and $\gamma$ is the angular offset between the optical axes of the first and second prisms. The new effective wedge angle increases the amount the prism steers the beam.

The Y component of the resulting beam (e.g., along the Y-axis or axis parallel to the optical axis of the second prism) steered by the second prism may be determined from Snell's Law and expressed as follows.

$$\theta_y = \sin^{-1}\left(\frac{n_M}{n_{air}}\sin\left(\sin^{-1}\left(\frac{n_{air}}{n_M}\sin(\rho\cos(\gamma) - 2\beta_\gamma)\right) + 2\beta_\gamma\right)\right) - \beta_\gamma \quad \text{(Equation 8)}$$

where $n_M$ is the index of refraction of the material of the prism, $n_{air}$ is the index of refraction of air, $\beta_\gamma$ is the newly derived wedge angle, $\rho$ is the X component of the beam exiting the first prism and $\gamma$ is the angular offset between the optical axes of the first and second prisms.

Since the X component of the beam along the X-axis (e.g., the transverse axis perpendicular to the optical axis of the second prism) effectively does not see the wedge (e.g., analogous to a slice perpendicular to the vertical optical axis which provides the same thickness or wedge angle), the X component of the resulting angle for the steered beam is basically unaltered. Thus, the resulting X component of the steering angle, $\theta_X$, is produced by the first prism and may be expressed as follows, $$\theta_x = \rho\sin(\gamma) \quad \text{(Equation 9)}$$

where $\rho$ is the angle of the X component of the beam exiting the first prism and $\gamma$ is the angular offset between the optical axes of the first and second prisms.

The magnitude of the resulting steering angle, $\theta_S$, is given by the root sum square (RSS) of $\theta_X$ and $\theta_Y$ and may be expressed as follows.

$$\theta_S = \sqrt{\theta_x^2 + \theta_y^2} \quad \text{(Equation 10)}$$

Generally, an arbitrary alignment between the optical axis of the second prism and the field of regard (FoR) is employed in an implementation. The above formulas may be further extended by applying one more coordinate transformations (e.g., a rotation about the Z-axis or axis parallel with the axis of rotation), where the most general form for steering the beam is obtained and any point within the entire FoR may be achieved. This may be expressed within polar coordinates in field space as follows.

$$\phi = \tan^{-1}\left(\frac{\theta_y}{\theta_x}\right) + \phi_0 \quad \text{(Equation 11)}$$

where $\phi$ represents the rotational component of the steering, $\phi_0$ represents the rotation between the optical axis of the second prism and the Field of Regard coordinate system, $\theta_X$ represents the X component of the steering angle for the beam and $\theta_Y$ represents the Y component of the steering angle for the beam.

Referring to FIG. 5, exemplary optical wedge prism 25 (e.g., inverted with respect to FIGS. 4A and 6) is symmetric about a plane perpendicular to prism rotation axis 60. Prism 25 typically includes a nominal thickness, $t_m$, at the portion proximate the truncated vertex. The prism includes an index of refraction, $n_1$, while the surrounding media (e.g., air) includes an index of refraction, $n_0$, typically approximated to 1.00. An average index of refraction for prism 25 may be determined for a prism portion or line (e.g., along the dashed-dotted line as viewed in FIG. 5) as a function of the distance, y, of that line from the base edge of prism 25 as follows (e.g., a weighted average of index of refraction values for line segments along the line based on line segment length), $$\bar{n}(y) = \frac{2n_1(D-y)\tan\beta + 2n_0 y\tan\beta}{2D\tan\beta} \quad \text{(Equation 12)}$$

where $n_1$ is the index of refraction of prism 25, $n_0$ is the index of refraction of air, D is the diameter or longitudinal dimension of prism 25, y is the distance from the prism edge and $\beta$ is the wedge angle of prism 25. The nominal thickness, $t_m$, of prism 25 does not contribute to the average index of refraction since the prism index of refraction remains relatively constant in the areas encompassed by the nominal thickness (e.g., between the vertical dotted lines as viewed in FIG. 5).

The linear change in the average index of refraction of prism 25 as a function of the distance, y, determines the steering angle of prism 25 as follows, $$\frac{d\bar{n}}{dy} = \frac{2n_0\tan\beta - 2n_1 D\tan\beta}{2D\tan\beta} = \left(\frac{n_0 - n_1 D}{D}\right)\tan\beta \quad \text{(Equation 13)}$$

where $n_1$ is the index of refraction of prism 25, $n_0$ is the index of refraction of air, D is the diameter or longitudinal dimension of prism 25 and $\beta$ is the wedge angle of prism 25. Therefore, prism 25 with a constant average index of refraction variation, $d\bar{n}/dy$, provides beam steering characteristics of a prism with a wedge angle, $\beta$, expressed as follows, $$\beta = \arctan\left(\frac{d\bar{n}}{dy} \cdot \frac{D}{n_0 - n_1 D}\right) \quad \text{(Equation 14)}$$

where $n_1$ is the index of refraction of prism 25, $n_0$ is the index of refraction of air and D is the diameter or longitudinal dimension of prism 25.

The desired prism characteristics (or steering angles, $\theta_R$ and $\theta_S$, for the first and second prisms 25) may be selected for given angular offsets, $\gamma$, where the prism wedge angles, $\beta$, providing these characteristics and physical attributes for the prisms (e.g., average index of refraction, diameter, etc.) may be determined from the above equations (e.g., Equations 1-14). The wedge angle, $\beta$, for first and second prisms 25 may be the same or different angle depending upon the characteristics desired.

Thus, based on a desired steering angle, $\theta_S$ or $\phi$, for the beam, controller 18 (FIG. 1) may utilize the above equations (e.g., Equations 6-11 with the known properties of the prisms (e.g., index of refractions of the material and air, wedge angle, etc.)) to determine the angular offset, $\gamma$, needed between the first and second prisms, and subsequently control motors 30 to orient the prisms in an appropriate fashion to steer the beam or alter the field of view in a desired manner.

Referring back to FIG. 1, prism-based beam steering for imaging applications introduces various effects to the images captured by camera 12. For example, dispersion effects of the prisms reduce the contrast and resolution of the captured image. Accordingly, prisms 25 may include gratings applied to one of the surfaces, thereby creating a "grism". The grism is specifically designed for the application to control dispersion over the spectral range of interest. A further effect of prism beam steering includes field distortion. In particular, the beam becomes compressed along the axis of steering as the prisms steer the beam. This creates a "squashed" appearance to the image. For example, a camera with an initially wide field of view (e.g., 60°) experiences up to approximately 15% distortion at the edges, but no distortion at the center. However, a camera with a 1° field of view experiences essentially no distortion as a function of field angle. In this case, the distortion is produced entirely from the steering of the prisms. By way of example, a 1° field of view with a steering angle of 45° includes a nearly uniform image distortion of approximately 30% appearing as a squashing of the image along the axis of steering.

Controller 18 addresses these effects through the use of image processing techniques (e.g., in the form of image processing software). The controller receives the captured images from camera 12 and adjusts the images to compensate for the distortion effects. The controller may apply any suitable conventional image processing techniques to compensate for the distortion. The controller receives prism orientation information from sensors 29 (FIG. 2) and takes into account the beam steering angle and the field of view of the security camera system during the image processing. The resulting images may be displayed on display device 20 and/or stored in image storage unit 21.

Controller 18 may further serve as a motion controller to coordinate prism movement or rotation with the telephoto or zoom capability. In particular, a particular region of interest for zooming may not be on-axis while the security camera system is focused with a wide field of view. In this case, a user may command the security camera system (via input devices 19) to focus on the region of interest. The controller controls lens assembly actuators 17 (FIG. 3A-3B) to manipulate lens 15 to zoom in on the area, and further controls motors 30 to rotate prisms 25 to pan the field of view to maintain the target or desired object on-center. Controller 18 may employ any conventional or other image processing techniques to identify the target or desired object within captured images. The identified target location within an image is utilized to determine the adjustment to the field of view. Controller 18 controls motors 30 accordingly to orient the prisms in a manner to adjust the field of view to place the target within the center portion of the field of view. Thus, controller 18 basically implements a feedback loop to adjust the prisms based on the location of the target within recently captured images of the field of view. The controller may adjust the prisms to place the target at any suitable locations within the field of view.

The security camera system may appear as a small inconspicuous disk mounted to a wall or other structure. The security camera system includes a small form factor and a fast reaction to changing conditions (e.g., a bank robbery, where the bank desires a good image of an assailant face). Thus, a person standing near the security camera system may not realize the presence of the security camera system behind the disk, and cannot determine the camera view or operation regardless of the orientation. This provides a number of advantages for a variety of security situations. Further, this feature is advantageous for observers of wildlife, where researchers may use the security camera system to track when a certain movement has occurred (e.g., with a much lower probability of disrupting the environment).

Figure 7:
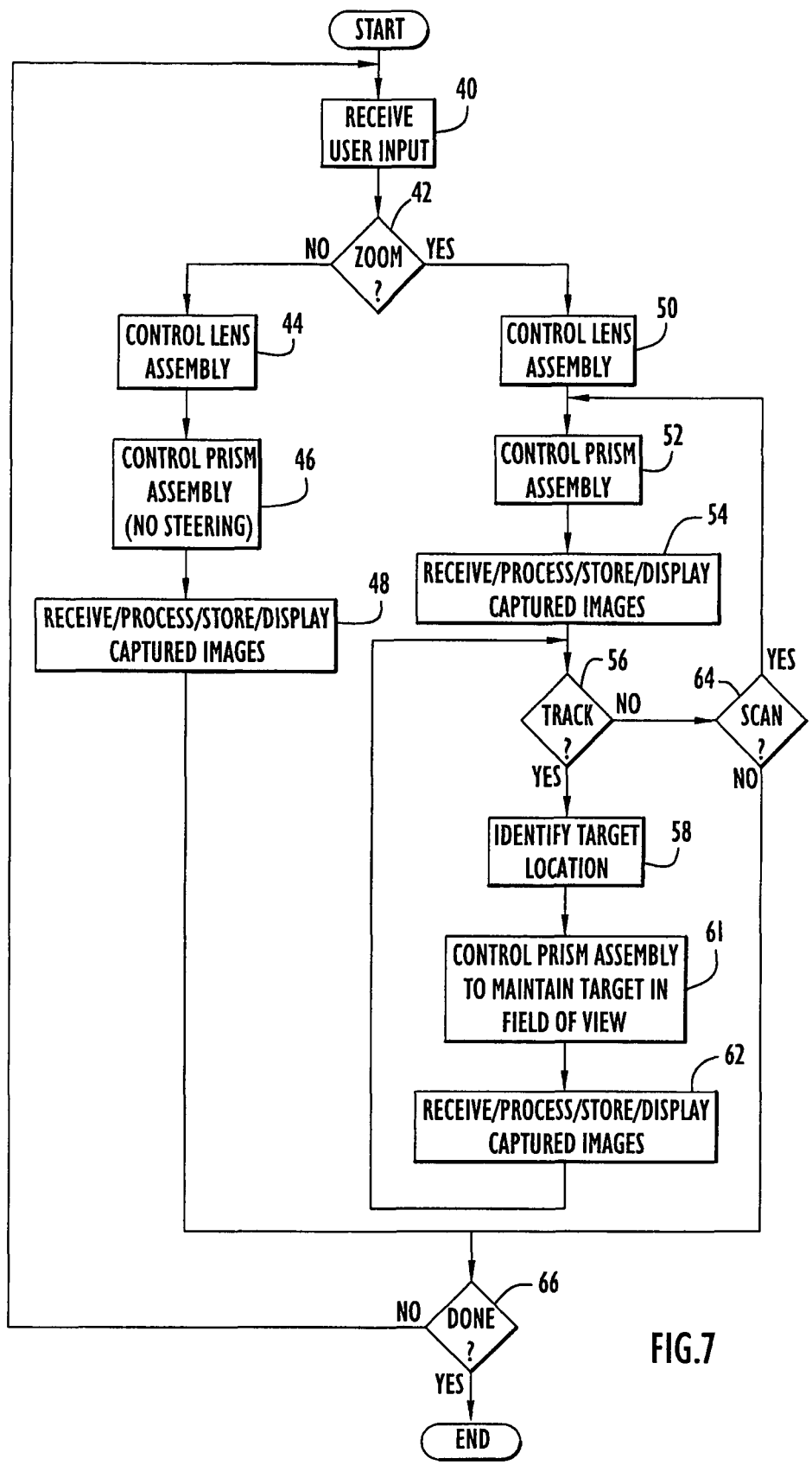
FIG. 7 is a procedural flow chart illustrating the manner in which a controller controls operation of the security camera system according to an embodiment of the present invention.

The manner in which controller 18 controls operation of the security camera system is illustrated in FIG. 7. Initially, security camera system 10 (FIG. 1) is mounted in an appropriate fashion (e.g., on a support surface or structure, etc.) to monitor a desired area. In particular, the desired mode (e.g., wide angle staring, zoom, etc.) is entered by a user via input devices 19 and received by controller 18 at step 40. If a wide angle staring mode is desired as determined at step 42, controller 18 controls lens assembly 14 (e.g., actuators 17) as described above to provide the appropriate wide angle view at step 44, and further controls prism assembly 16 (e.g., motors 30) as described above to orient prisms 25 to provide virtually no beam steering at step 46. Images from the security camera system view (e.g., the direction of aim) are captured by camera 12 and processed by controller 18 as described above for viewing and/or storage at step 48.

When the zoom mode is desired as determined at step 42, controller 18 controls lens assembly 14 (e.g., actuators 17) as described above to provide the desired zoom level entered by the user and corresponding focus at step 50. The controller further controls prism assembly 16 (e.g., motors 30) as described above to orient prisms 25 to steer incoming beams to view a desired region of interest at step 52. Images from the security camera system view (e.g., the direction of beam steering) are captured by camera 12 and processed by controller 18 as described above for viewing and/or storage at step 54.

If the security camera system is directed to track motion as determined at step 56, controller 18 controls the prism assembly to maintain an object within a desired location in the field of view. In particular, the controller processes captured images and identifies the location of the object within those images at step 58. The identified location is utilized to control prism assembly 16 (e.g., motors 30) as described above to steer the beam (or adjust the field of view of the security camera system) to place the object in the desired location within the field of view at step 61. This enables the security camera system to basically track movements of subjects or objects within the region of interest (e.g., track and/or follow an assailant or intruder in the region of interest). Images from the security camera system view (e.g., the direction of beam steering) are captured by camera 12 and processed by controller 18 as described above for viewing and/or storage at step 62. The process is repeated (e.g., steps 58, 61 and 62) until the track motion mode is terminated by the user.

When the security camera system is directed to scan an area as determined at step 64, controller 18 controls prism assembly 16 (e.g., motors 30) as described above to continuously rotate the prisms and alter the beam steering (and field of view) to scan the region of interest at step 52. In this case, the field of view is constantly altered to effectively scan the region of interest. Images from the security camera system view (e.g., the direction of beam steering) are captured by camera 12 and processed by controller 18 as described above for viewing and/or storage at step 54. The process is repeated (e.g., steps 52 and 54) until the scan mode is terminated by the user. The above controller operations are repeated until the user disables the security camera system as determined at step 66.

It is to be understood that the operational modes of the security camera system (e.g., stare, zoom, scan, track, etc.) may be used individually or in any suitable combinations to perform various functions. For example, an area may be initially viewed (e.g., stare mode) or scanned (e.g., scan mode) by the security camera system in order to identify an object, and subsequently zoomed in order to track movement of the object within the area. Further, the stare mode may be utilized to identify a region of interest for subsequent zooming and/or scanning. The various modes may be entered automatically via controller 18, or manually in accordance with user entered commands via input devices 19.

It will be appreciated that the embodiments described above and illustrated in the drawings represent only a few of the many ways of implementing a security camera system and method of steering beams to alter a field of view.

The security camera system components may be housed within any suitable housing for placement or mounting at any desired locations relative to an area of interest. Preferably, the security camera system is disposed at a location within the area for limited visibility, and/or camouflaged or hidden. The security camera system may receive power from any suitable power source (e.g., wall outlet jacks, batteries or other portable source for portability, etc.). The camera may be implemented by any quantity of any conventional or other image capture device (e.g., CCD array, light detectors, etc.) and may produce images of any suitable resolutions. The lens assembly may include any quantity of any conventional or other lenses or optical devices with any suitable optical properties (e.g., any zoom properties, wide angle properties, focusing properties, etc.). The actuators may be of any quantity, and may be implemented by any conventional or other mechanisms (e.g., motors, etc.) to adjust the lens.

The lens may be implemented as an integral unit with the prisms, where the combined lens and prism assembly may have the appearance of and be utilized as a lens unit. The lens unit may be utilized with various image capturing or optical devices (e.g., still or video cameras, etc.) to enable inconspicuous capture of images (e.g., wildlife, children, suspect, etc.).

The display device may be implemented by any quantity of any conventional or other display devices (e.g., LCD, etc.), may be of any shape or size and may be disposed at any suitable locations (e.g., internal or external of the security camera system, local or remote from the security camera system, etc.). The image storage unit may be implemented by any quantity of any conventional or other storage units or structures (e.g., memories, buffers, databases, etc.). The images from the camera may be stored in the image storage unit prior to or after processing by the controller. The image storage unit may be disposed at any suitable locations (e.g., internal or external of the security camera system, local or remote from the security camera system, etc.).

The prism assembly may include any quantity of components (e.g., motors, rotating assemblies, sensors, etc.) arranged in any desired fashion. The prism assembly may employ any quantity of prisms and/or other beam manipulating devices arranged and/or oriented in any desired fashion to steer any type of beam in any desired manner. The rotating assemblies may be of any quantity, shape or size and may be implemented by any conventional or other assemblies. The rotating assemblies may include any suitable rotating mechanism (e.g., rotating ring, platform or other suitable structure) to secure and rotate a beam manipulating device (e.g., prism, etc.) and may be disposed at any suitable locations. The rotating assemblies may manipulate the beam steering devices (e.g., prism, etc.) to any suitable orientations to steer the beam or adjust the field of view in a desired manner. The motors may be of any quantity, shape or size and may be implemented by any conventional or other motors or actuators to rotate the beam manipulating devices (e.g., prism, etc.).

The sensors may be of any quantity and may be implemented by any conventional or other sensors (e.g., encoders, potentiometers, etc.) to measure the rotation of the beam manipulating devices (e.g., prism, etc.) and/or other system conditions. The sensors may be disposed at any suitable locations to measure the rotation (e.g., motors, rotating assemblies, etc.) of the beam manipulating devices (e.g., prism, etc.).

The controller may be of any quantity and may be implemented by any conventional or other controller or processor (e.g., microprocessor, controller, control circuitry, logic, etc.). The controller may receive images from the camera and/or retrieve captured images from storage to perform image processing. The controller may employ any conventional or other image processing techniques to compensate for any effects or deformities in the captured images (e.g., distortion, squashing, etc.). The controller may control the lens assembly to provide any suitable views (e.g., zoom, wide angle, etc.), and the prism assembly to provide any suitable field of view. The controller may implement any suitable modes for the security camera system (e.g., zoom, stare, track, scan, etc.) based on user input or occurrence of userspecified or other conditions. The modes (e.g., stare, zoom, track, scan, etc.) may be utilized individually or in any combinations. The controller may identify any suitable objects within a field of view for tracking and/or placement within any desired locations in the field of view. The controller may employ any conventional or other image processing techniques to identify a desired object within captured images. The security camera system may be utilized in combination with and/or controlled by any suitable external devices, where the security camera system (e.g., controller, etc.) may further provide the captured or processed images to the external devices for further processing, storage and/or display (e.g., computer system, remote displays or monitors, etc.).

The input devices may be of any quantity, may be implemented by any conventional or other input devices (e.g., buttons, switches, slides, keypad, etc.), and may be disposed at any suitable locations (e.g., on or external of the security camera system). Further, the input devices may be in the form of a control unit with a wired or wireless interface to the security camera system.

The prisms may be of any quantity, shape, size or thickness and may include any suitable materials. The prisms may be configured to provide any desired steering effect or angle of refraction, and include any desired optical properties (e.g., of a prism, lens and/or other beam manipulating device) and/or surfaces (e.g., planar, aspherical, spherical, etc.). The prisms may include any types of coatings or gratings to compensate for effects of the beam steering. The prisms may be oriented in any fashion relative to each other (e.g., coincident, partially coincident, any rotational or angular offset, any separation distance, etc.) to provide any desired degree of beam steering (or alteration of the field of view).

The software (e.g., image processing, control, etc.) for the controller of the present invention embodiments may be implemented in any desired computer language and could be developed by one of ordinary skill in the computer arts based on the functional descriptions contained in the specification and flow chart illustrated in the drawings. Further, any references herein of software performing various functions generally refer to computer systems or processors performing those functions under software control. The controller of the present invention embodiments may alternatively be implemented by any type of hardware and/or other processing circuitry. The various functions of the controller may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). The software and/or algorithms described above and illustrated in the flow chart may be modified in any manner that accomplishes the functions described herein. In addition, the functions in the flow chart or description may be performed in any order that accomplishes a desired operation.

The software of the present invention embodiments may be available on any device or apparatus with a recordable or computer readable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The security camera system of the present invention embodiments is not limited to the specific applications disclosed herein, but may be applied to any situations performing monitoring or capturing images.

It is to be understood that the terms "top", "bottom", "front", "rear", "side", "height", "length", "width", "upper", "lower", "thickness", "vertical", "horizontal" and the like are used herein merely to describe points of reference and do not limit the present invention embodiments to any particular orientation or configuration.

From the foregoing description, it will be appreciated that the invention makes available a novel security camera system and method of steering beams to alter a field of view, wherein a security camera system includes a plurality of rotatable prisms that steer incoming beams to control and adjust the field of view.

Having described preferred embodiments of a new and improved security camera system and method of steering beams to alter a field of view, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A security camera system comprising:
a lens assembly to provide at least one of a zoom view and a wide angle view;
a beam manipulating assembly disposed distally of said lens assembly and including a plurality of beam manipulating devices positioned coincident each other to successively receive an incoming beam with each beam manipulating device mounted on a corresponding rotation assembly to rotate that beam manipulating device relative to other beam manipulating devices to steer said incoming beam from a surrounding environment and control a field of view of said security camera system, wherein each rotation assembly rotates said corresponding beam manipulating device about a common transverse axis of rotation extending through said coincident beam manipulating devices and to angular positions relative to an optical axis of that beam manipulating device, and wherein said plurality of beam manipulating devices comprises prisms;
an image capture device to capture images through said lens assembly and beam manipulating devices; and
a controller to control said lens and rotation assemblies to provide a desired field of view, wherein said controller controls said rotation assemblies to rotate said beam manipulating devices to positions at angular offsets from each other relative to said common transverse axis of rotation to steer said incoming beam for said desired field of view and includes:
a track module to identify an object within said field of view and control said beam manipulating assembly to orient said beam manipulating devices relative to each other to adjust said field of view to encompass said object in response to object motion.

2. The system of claim 1, wherein said prisms include planar surfaces.

3. The system of claim 2, wherein said prisms include gratings to compensate for dispersion effects from said steering of said incoming beam.

4. The system of claim 1, wherein said controller controls said beam manipulating assembly to orient said beam manipulating devices relative to each other to inhibit steering of said incoming beam in response to said lens assembly providing said wide angle view.

5. The system of claim 1, wherein said controller controls said beam manipulating assembly to orient said beam manipulating devices relative to each other to enable steering of said incoming beam in response to said lens assembly providing said zoom view.

6. The system of claim 1, wherein said controller further includes:
an image processing module to process said captured images to compensate for distortion effects from said steering of said incoming beam.

7. The system of claim 6, wherein said beam manipulating assembly includes at least one sensor to monitor orientation of said beam manipulating devices relative to each other, and said image processing module processes said captured images in accordance with said orientation of said beam manipulating devices.

8. The system of claim 1, wherein said security camera system includes a planar aperture.

9. The system of claim 1, wherein said controller further includes:
a scan module to control said beam manipulating assembly to continuously adjust orientation of said beam manipulating devices relative to each other to alter said field of view to scan a desired area.

10. The system of claim 1, wherein said controller further includes:
an image processing module to identify a location of said object within said captured images for adjusting said field of view to encompass said object in response to object motion.

11. A method of adjusting a field of view of a camera system including a lens assembly, a beam manipulating assembly disposed distally of said lens assembly and including a plurality of beam manipulating devices positioned coincident each other to successively receive an incoming beam with each beam manipulating device mounted on a corresponding rotation assembly to rotate that beam manipulating device relative to other beam manipulating devices, a controller and an image capture device, wherein each rotation assembly rotates said corresponding beam manipulating device about a common transverse axis of rotation extending through said coincident beam manipulating devices and to angular positions relative to an optical axis of that beam manipulating device, said method comprising:
(a) providing at least one of a zoom view and a wide angle view;
(b) controlling said lens and rotation assemblies to provide a desired field of view, wherein said rotation assemblies are controlled to rotate said beam manipulating devices to positions at angular offsets from each other relative to said common transverse axis of rotation to steer said incoming beam from a surrounding environment to control said field of view, and wherein said plurality of beam manipulating devices comprises prisms;
(c) capturing images through said lens assembly and beam manipulating devices; and
(d) identifying an object within said field of view and controlling said beam manipulating assembly to orient said beam manipulating devices relative to each other to adjust said field of view to encompass said object in response to object motion.

12. The method of claim 11, wherein said prisms include planar surfaces.

13. The method of claim 12, wherein said prisms include gratings to compensate for dispersion effects from said steering of said incoming beam.

14. The method of claim 11, wherein step (b) further includes:
(b.1) controlling said beam manipulating assembly to orient said beam manipulating devices relative to each other to inhibit steering of said incoming beam in response to providing said wide angle view.

15. The method of claim 11, wherein step (b) further includes:
(b.1) controlling said beam manipulating assembly to orient said beam manipulating devices relative to each other to enable steering of said incoming beam in response to providing said zoom view.

16. The method of claim 11, wherein step (c) further includes:
(c.1) processing said captured images to compensate for distortion effects from said steering of said incoming beam.

17. The method of claim 16, wherein said beam manipulating assembly includes at least one sensor to monitor orientation of said beam manipulating devices relative to each other, and step (c.1) further includes:
(c.1.1) processing said captured images in accordance with said orientation of said beam manipulating devices.

18. The method of claim 11, wherein said camera system includes a planar aperture.

19. The method of claim 11, wherein step (b) further includes:
(b.1) controlling said beam manipulating assembly to continuously adjust orientation of said beam manipulating devices relative to each other to alter said field of view to scan a desired area.

20. The method of claim 11, wherein step (d) further includes:
(d.1) identifying a location of said object within said captured images for adjusting said field of view to encompass said object in response to object motion.

* * * * *